March 3, 1931.   W. J. WRIGHTON ET AL   1,794,571
TRIAL FRAME
Filed June 2, 1927   2 Sheets-Sheet 2
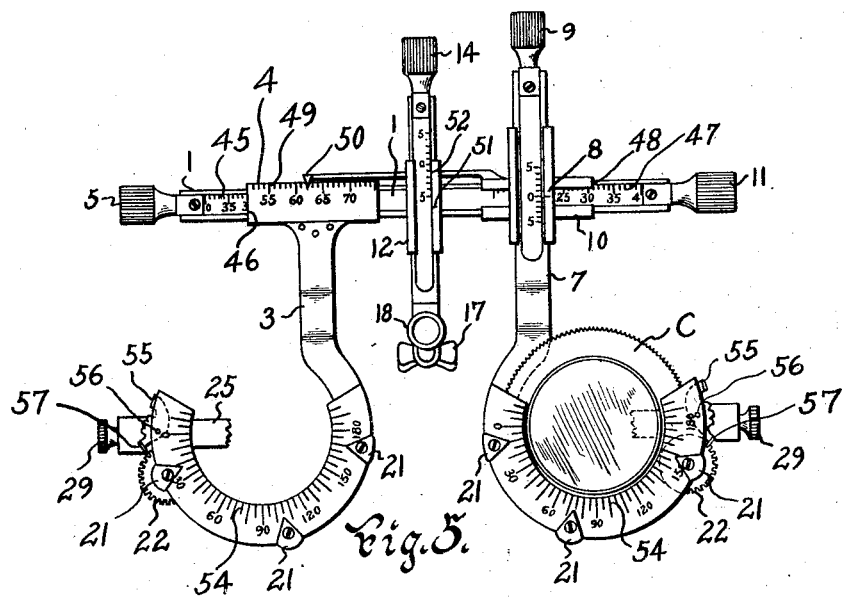
Fig. 5.
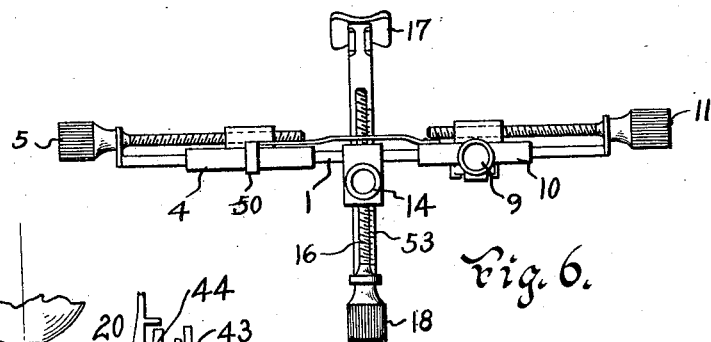
Fig. 6.
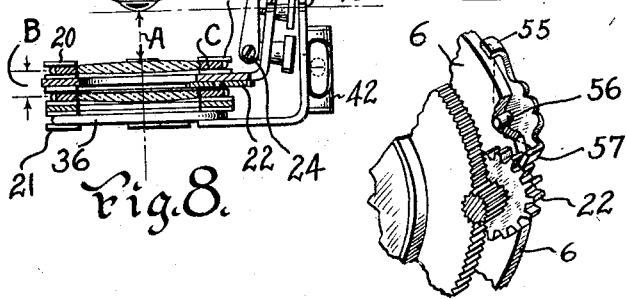
Fig. 8.
Fig. 7.
Inventor
William J. Wrighton
Edgar D. Tillyer
By Harry H. Styll
Attorneys Patented Mar. 3, 1931

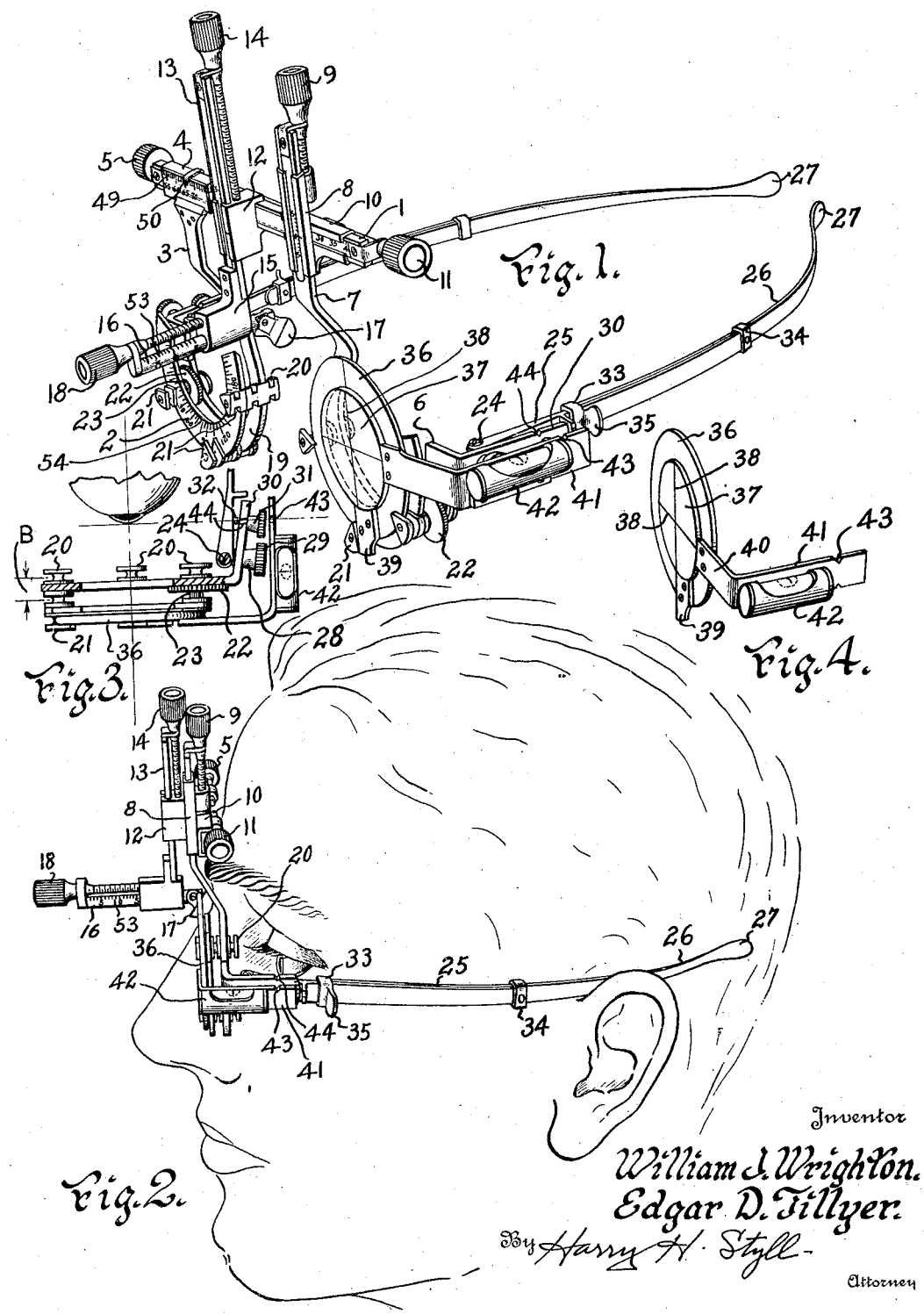

1,794,571

UNITED STATES PATENT OFFICE

WILLIAM J. WRIGHTON AND EDGAR D. TILLYER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

TRIAL FRAME

Application filed June 2, 1927. Serial No. 195,950.

This invention relates to improvements in trial frames and more particularly to a trial frame adapted for the use of test lenses which have been computed to measure the errors of refraction of the eye in the so-called vertex refraction or effective power, namely the power is calculated from the eye or ocular side of the lens.

The invention further relates to such a trial frame having one cell immovable vertically and one cell movable vertically, together with means for adjusting the device at required distance of the lens from the eye and for the pupillary distance and for accommodation of the nose and facial requirements of the wearer.

The principal object of the invention is to provide a lens cell for a plurality of lenses, one in front of the other, having a fixed distance between the lens which has been accounted for in calculating the power of the lenses so as to produce the required refractive power at the required distance from the eye.

Another object of the invention is to provide improved means for leveling the instrument when in place on the wearer's face.

Another object of the invention is to provide means for adjusting the lens cells at a prescribed distance from the cornea of the eye and of measuring the said distance.

Another object of the invention is to provide a cross bar scale that will give both the distance of each eye cell from the central line of the cross bar and also the total pupillary distance between the eyes.

Another object of the invention is to provide supplemental lens holders on the eye cells of such improved form that they will hold the lenses in required position without hiding the arcuate scale on the lens holders.

Another object of the invention is to provide improved means for angling and positioning the temples to the facial requirements of the wearer.

Another object of the invention is to provide improved simple and economical means for carrying out all of the requirements of positioning the test lenses before the patient's eye.

Another object of the invention is to provide a combination of a lens cell holder and a trial ring that cooperate to maintain the calculated distance between the lenses in the cell.

Other objects and advantages of the invention will become apparent from the following description taken in connection with the accompanying drawings, and it will be apparent that many modifications may be made in the details of construction and arrangement of parts without departing from the spirit of the invention as expressed in the accompanying claims. We, therefore, do not wish to be limited to the exact details and arrangements shown, the preferred forms only having been shown by way of illustration.

Referring to the drawings:

Fig. 1 is a perspective view of a trial frame embodying the invention.

Fig. 2 is a side view of a trial frame embodying the invention in place on the face of the patient.

Fig. 3 is a fragmentary plan view showing the relationship of the cornea of the eye to the lens cells and the means of adjusting and measuring the same.

Fig. 4 is a perspective view of a supplementary lens attachment having cross lines for the center of the eye leveling means and means for aligning the frame in line with the cornea of the eye.

Fig. 5 is a front elevation showing the cross bar scales.

Fig. 6 is a top or plan view of Fig. 5.

Fig. 7 is a partial perspective view partly in section showing means for locking the lens turning means.

Fig. 8 is a sectional fragmentary view showing the relationship of the cornea of the eye to the lens cells in a diagrammatic manner.

This invention relates to that type of instrument known as a trial frame by which an occulist or optometrist measures the errors of refraction of trial lenses for a patient needing correction for eyeglasses and spectacles or the like, wherein said lenses have been made to the so-called vertex refraction.

It has been found in the prior art that unless great care is exercised the trial frame will assume an angular position with respect to the patient's eye and instead of looking normally through the trial lens he will look through it at an angle, which introduces an error into the examination, the extent of this depending on the amount of departure from normal.

It has also been found with prior art devices of this nature very difficult to locate the lens at the proper distance from the eye of the patient. The trial lens should be located at the same distance from the patient's eye as the finished prescription lens is to be worn by the patient, and I have provided means in my invention by which this required distance may be measured, and have provided adjustments for obtaining the same.

Referring to the drawings wherein similar characters of reference are employed to denote corresponding parts, a cross bar 1 is provided with a lens cell 2 carried by a supporting arm 3 which is attached to a slide 4 which is operated by a screw 5 to move the eye cell longitudinally of the cross bar 1. This eye cell 2 is not adjustable in a direction transverse to the cross bar, and in my invention the eye cell 2 is carried on the side opposite the right eye of the patient. On the opposite side of the cross bar 1 is carried a second eye cell 6 supported by an arm 7 which is movable in a slide 8 in a direction transverse to the bar 1 by means of a screw 9. The slide 8 is in turn attached to a second slide 10 on the cross bar 1 which is operated by the screw 11 to move the eye cell 6 longitudinally of the cross bar 1. It will be seen that the lens cell 6 is adjustable longitudinally of the cross bar 1 as well as in a direction transverse to the cross bar.

Rigidly secured to the cross bar 1 is the support 12. Slidably mounted in the support 12 is the scale bar 13 which is slidably movable in the support 12 by means of the screw 14. Adjacent one end of the scale bar 13 is a second support bracket 15 through which is slidably mounted the nose rest bar 16, said bar being circular in cross section. On the facial end of the nose rest bar 16 is the nose rest 17 which is barrel shape in cross section and adapted to engage the bridge of the patient's nose, said nose rest 17 being rigidly secured to the nose rest bar 16. The nose rest 17 is moved inwardly towards the nose or outwardly therefrom by means of the screw 18.

The structure of the lens cells is shown in Figs. 3 and 8. The structure of these cells is the most important feature of the trial frame in that the cells are designed to seat a plurality of lenses calculated in effective power or vertex refraction as it is sometimes called, the place of which is to be taken by a single lens that is to be worn by the patient so that the side of the trial lens nearest to the eye must be maintained at the same distance from the eye as the eye side of the lens which is to be worn by the patient.

In Fig. 8 this dimension is designated by A. Also the distance between the lens cells indicated by B in Fig. 8 must be maintained a specific calculated distance because this distance has been taken care of in the calculation and manufacture of the trial lenses. The cells themselves have to be made in such a way that the rim C which holds the trial lens will fit snugly in the cell for all powers of lenses so that there will be no loose play. In other words, the trial lenses in the cells before the eye are a part of a lens system, the units of which must be maintained in calculated position to give the required powers and to insure the proper lens that the patient is to wear in his eyeglass or spectacle. The general structure of the two lens cells 2 and 6 is the same, and consists of a central cell 19, an auxiliary cell 20 on the facial side of the instrument, and an auxiliary cell 21 on the examiner's side of the instrument. The cell 20 consists of three recessed studs as shown in Fig. 2. In the cell 19 is a knurled thumb wheel 22 which turns or operates a recess stud 23 on which the edge of the lens rests. By turning the wheel 22 the lens may be rotated in the lens cell. The lenses in the cells 20 and 21 are turned by hand. The studs of the cell 21 are made triangular in shape in order to prevent the opposite scale on the lens cell being obscured, and to also provide holding means for the lens. Pivoted at 24 to the ends of the lens cells are the temples consisting of a front portion 25 and a portion 26 slidably mounted on the first portion 25. The rear ends 27 and the section of the piece 26 adjacent thereto are flexible in order to give a spring tension grip on the side of the head of the wearer to hold the device in place on the face. The temples are pivoted at 24 to swing in a plane parallel with the cross bar. They are also pivoted at 28 on the set screw pivot to swing in a plane transverse to the plane of the cross bar, the set screw 29 being adapted to adjust and hold the temple in any desired adjusted position in the last named plane. There is an extension 30 from the pivot 24 extending towards the face of the wearer. This extension carries a set screw 31 with the extending point 32 adapted to engage the portion 25 of the temple. This set screw 31 and point 32 may be set to limit the swing of the temple in a plane parallel with that of the cross bar. 33 and 34 are guide members on the temple and 35 is a finger grip member used for adjusting the portion 26 on the portion 25 of the temple.

In Fig. 4 there is shown an appliance that fits in the cell 21. This consists of a lens ring 36 having a lens 37 mounted therein, which lens has the cross lines 38 engraved thereon, the intersection of the cross lines indicating the center of the lens. On one side of the lens ring 36 is a stop member 39 adapted to engage the middle one of the three cells 21 as shown in Fig. 1. This engagement of the portion 39 of the triangular cell 21 insures the aligning of the cross line parallel to the cross bar. Extending from one side of the ring 36 is the arm 40 having a right angle bent portion 41. Secured to the portion 41 is a spirit level 42 and on the upper edge adjacent its end is the notch 43. In the top of the extension 30 is also a notch 44 which aligns with the notch 43 of the arm 41. This attachment of the connections to the ring 36 serves the following purposes. The cross lines 38 are used to align the lens cell with the center of the pupil of the eye by means of the proper cell arrangements heretofore described. The level 42 on the arm 41 indicates whether or not the instrument is level on the face of the wearer. This is of particular importance where thick lenses are used, such as cataract lens or other high power lenses wherein it is of importance that the wearer look normally through the trial lens instead of at an angle to avoid the introduction of error in the examination for the patient's prescription. This is of particular importance and an advance in the art of such eye examinations.

The notch 43 in connection with the notch 44 is used to align the lens cell at the proper distance from the cornea of the eye as is shown in Fig. 3. The notches 43 and 44 are set in a line, that is tangent to the cornea of the eye and the nose rest 17 adjusted to the face so that the instrument is snugly held on the face with the notches 43 and 44 in alignment with the cornea of the eye as indicated in Figs. 2 and 3. This alignment is also shown in Fig. 2.

In Figs. 5 and 6, we have indicaed the scale arrangements of the instrument. On the cross bar 1 is a scale 45 which registers with the edge 46 of the cell 2 to indicate the distance from the center line of the nose rest to the center of the pupil of the right eye, while on the other end of the cross bar 1 is the scale 47 which registers with the edge 48 of the slide 10 which indicates the distance of the cell 6 from the center line of the nose piece. In addition we have arranged a scale 49 on the movable cell 2 which registers with the pointer 50 on the slide 10, this scale being graduated to read the total distance between the center of the pupils of the two eyes or the pupillary distance. There is a scale 52 on the scale bar 13 which registers with the line 51 to indicate the movement of the nose rest in a direction transverse to the cross bar 1, and also a scale 53 on the under side of the nose rest bar 16 which indicates the movement of the nose rest towards and away from the face of the patient. There is also on the cells 2 and 6 a protractor or arcuate scale 54 by which the movement of the trial lenses in the cells is indicated. It is in connection with this scale 54 that the cell members 21 are of importance. These cell members have been arranged in triangular form so as not to obscure the scale 54.

In Fig. 7 is shown means for locking the wheel 22 to prevent accidental turning of a lens in the lens cell. This device comprises a lever 55 pivoted to the lens cell at 56 and having a finger 57 adapted to engage between the teeth of the wheel 22. When the lens in the cell has been turned to desired position the finger 57 is inserted between the teeth of the wheel 22 to lock the wheel against turning. When turning the wheel 22 the finger 57 is out of engagement with the teeth of the wheel 22. The finger 57 is moved into and out of engagement with the wheel 22 by the lever 55.

The operation of the various members has been described above at the same time their structure was described.

From the foregoing description it will be seen that we have provided a simple, compact and efficient trial frame with efficient means for maintaining the trial lenses in their calculated positions and for obtaining the usual measurements and in addition thereto improved means for levelling the instrument, for adjusting the instrument the proper distance from the cornea of the eye, for aligning the instrument with the pupils of the eyes, and scale means for giving the various required measurements, together with improved temple connections in the instrument adapted to carry out the various requirements and to hold the instrument in the required position on the face.

Having described our invention, we claim:

1. In a device of the character described in combination with a frame to hold a lens before the eye, a lens cell, a temple having an indication mark adjacent the lens cell, means for resting the frame on the nose, a member adapted to fit in the lens cell and having an arm with a portion lying adjacent to and substantially parallel with the temple when the member is in the lens cell and having an indication mark aligned with the indication mark in the temple when the member is in the lens cell, and means to move the frame towards and away from the face when resting on the nose whereby the line of alignment of the indication marks will be tangent to the pupil of the eye.

2. In a device of the character described in combination with a frame to hold a lens before the eye, a lens cell, a temple having an indication mark adjacent the lens cell, means for resting the frame on the nose, a lens holding member adapted to fit in the lens cell and having an arm with a portion lying adjacent to and substantially parallel with the temple when the member is in the lens cell and having an indication mark aligned with the indication mark on the temple when the member is in the lens cell, a lens in the lens holding member having cross lines intersecting at the center thereof, and means to move the frame towards and away from the face when resting on the nose whereby the line of alignment of the indication marks will be tangent to the pupil of the eye.

3. In a device of the character described in combination with a frame to hold a lens before the eye, a lens cell, a temple adjacent the lens cell, means for resting the frame on the nose, a member adapted to fit in the lens cell and having an arm with a portion lying adjacent to and substantially parallel with the temple when the member is in the lens cell, and a spirit level on the portion of the arm lying substantially parallel with the temple, said level being arranged to indicate whether or not the frame is held on the nose in a true vertical plane before the eye.

4. In a device for testing the eye, in combination with supporting means to hold a lens before the eye, a spirit level secured to the lens supporting means in a position whereby the longitudinal axis of the level is normal to the plane of the lens so that the level will indicate whether or not the plane of the lens when held before the eye lies coincident with a true vertical plane.

5. In a device of the character described in combination with a frame to hold a lens before the eye, a lens cell, a temple having an indication mark adjacent the lens cell, means for resting the frame on the nose, a lens member adapted to fit in the lens cell and having an arm with a portion lying adjacent to and substantially parallel with the temple when the lens holding member is in the lens cell and having an indication mark aligned with the indication mark on the temple when the member is in the lens cell, a lens in the lens cell having cross lines intersecting at the center thereof, a spirit level on the arm of the lens holding member adapted to indicate whether or not the frame is held on the nose in true vertical position, and means to move the frame towards and away from the face when resting on the nose whereby the line of alignment of the indication marks will be tangent to the pupil of the eye.

6. In a device of the character described in combination with a frame to hold a lens before the eye, a lens cell, a temple having an indication mark adjacent the lens cell, means for resting the frame on the nose, a member adapted to fit in the lens cell and having an arm with a portion lying adjacent to and substantially parallel with the temple when the member is in the lens cell and having an indication mark aligned with the indication mark on the temple when the member is in the lens cell, a spirit level on the portion of the arm lying substantially parallel with the temple adapted to indicate whether or not the frame is held on the nose in true vertical position, and means to move the frame towards and away from the face when resting on the nose whereby the line of alignment of the indication marks will be tangent to the pupil of the eye.

7. In a device of the character described in combination with a frame to hold a lens before the eye, a lens cell, a temple having an indication mark adjacent the lens cell, means for resting the frame on the nose, a member adapted to fit in the lens cell and having an arm with a portion lying adjacent to and substantially parallel with the temple when the member is in the lens cell and having an indication mark aligned with the indication mark on the temple when the member is in the lens cell, interengaging stop means on the member and lens cell adapted to locate the member in the lens cell in desired position, and means to move the frame towards and away from the face when resting on the nose whereby the line of alignment of the indication marks will be tangent to the pupil of the eye.

8. In a device of the character described in combination with a frame to hold a lens before the eye, a lens cell, means for resting the frame on the nose, a lens holding member adapted to fit in the lens cell and having an extended arm, interengaging stop means on the lens cell and on the lens holding member adapted to position the lens holding member in the cell in desired position, a lens in the lens holding member having cross lines intersecting at the center thereof, and a spirit level on the extending arm positioned to indicate whether or not the frame is held in a vertical plane before the eye.

9. In a device of the character described in combination with a frame to hold a lens before the eye, a lens cell, a temple having an indication mark adjacent the lens cell, means for resting the frame on the nose, a member adapted to fit in the lens cell and having an arm with a portion lying adjacent to and substantially parallel with the temple when the member is in the lens cell and having an indication mark aligned with the indication mark on the temple when the member is in the lens cell, a lens in the member having cross lines intersecting at the center thereof, interengaging stop means on the member and lens cell to position the member in desired place in the lens cell, a spirit level on the arm of the member adapted to indicate whether or not the frame is held in the vertical plane before the eye, and means to move the frame towards and away from the face when resting on the nose whereby the line of alignment of the indication marks will be tangent to the pupil of the eye.

10. In a trial frame in combination with means to hold the same in position before the eye, a cross bar, a pair of lens cells slidable longitudinally on the cross bar, scale means on the bar adjacent each lens cell adapted to indicate the distance of its adjacent lens cell from the center of the nose, additional scale means on one of the lens cells and a pointer on the other lens cell adapted to register with the additional scale means to indicate the total distance between the centers of the two cells.

11. In a trial frame in combination with means to hold the same in position before the eye, a lens cell, a knurled pinion for turning the lens in the cell, a toothed wheel to turn the pinion and a pivoted member having a tooth adapted to engage the teeth of the toothed wheel to lock the lens turning means in any desired position to prevent accidental turning of the lens.

12. In a device for testing the eyes, means for holding an optical lens system before the eyes at a point where the distance of the composite effective power point of said lens system from the eyes will be the same as the distance from the eyes to the effective power point of the single prescription lens as determined by the test will be worn by the person tested, said distance being a constant predetermined factor used in calculating the powers of all units of a series of prescription lenses designed to be worn at that distance before the patient's eyes and means spaced from the lens holding means on the eye side thereof for aligning the said holding means with reference to a predetermined datum point of the patient's anatomy at an unvariable distance from said lens holding means, whereby said lens holding means may be stationed at the point where the composite effective power point of the lens system will be located at this predetermined distance from the eyes.

13. In a device for testing the eyes, means for holding an optical lens system before the eyes at a point where the distance of the composite effective power point of said lens system from the eyes will be the same as the distance from the eyes to the effective power point of the single prescription lens as determined by the test will be worn by the person tested said distance being a constant predetermined factor used in calculating the powers of all units of a series of prescription lenses designed to be worn at that distance before the patient's eyes and means spaced from the lens holding means on the eye side thereof for aligning the said holding means with reference to a predetermined datum point of the patient's anatomy at an unvariable distance from said lens holding means whereby said lens holding means may be stationed at the point where the composite effective power point of the lens system will be located at this predetermined distance from the eyes and means for moving the lens holding means to position the effective power point of the lens system at the predetermined position from the eyes.

14. In a device for testing the eyes, means for holding an optical lens system before the eyes at a point where the distance of the composite effective power point of said lens system from the eyes will be the same as the distance from the eyes to the effective power point of the single prescription lens as determined by the test will be worn by the person tested said distance being a predetermined factor used in calculating the power of the prescription lens designed to be worn at that distance before the patient's eyes and means spaced from the lens holding means on the eye side thereof for aligning the said holding means with reference to a predetermined datum point of the patient's anatomy at an unvariable distance from said lens holding means whereby said lens holding means may be stationed at the point where the composite effective power point of the lens system will be located at this predetermined distance from the eyes.

15. In a device for testing the eyes, means for holding an optical lens system before the eyes at a point where the distance of the composite effective power point of said lens system from the eyes will be the same as the distance from the eyes to the effective power point of the single prescription lens as determined by the test will be worn by the person tested said distance being a predetermined factor used in calculating the power of the prescription lens designed to be worn at that distance before the patient's eyes, means spaced from the lens holding means on the eye side thereof for aligning the said holding means with reference to a predetermined datum point of the patient's anatomy at an invariable distance from said lens holding means whereby said lens holding means may be stationed at the point where the composite effective power point of the lens system will be located at this predetermined distance from the eyes and means for moving the lens holding means to position the effective power point of the lens system at the predetermined position before the eyes.

WILLIAM J. WRIGHTON.
EDGAR D. TILLYER.